US007454495B2

(12) United States Patent
Chen et al.

(10) Patent No.: US 7,454,495 B2
(45) Date of Patent: Nov. 18, 2008

(54) INTELLIGENT MODULAR SERVER MANAGEMENT SYSTEM FOR SELECTIVELY OPERATING AND LOCATING A PLURALITY OF COMPUTERS

(75) Inventors: Alan Chen, Taipei (TW); David Hsieh, Taipei (TW); Tomy Kan, Taipei Hsien (TW)

(73) Assignee: Raritan America, Inc., Somerset, NJ (US)

( * ) Notice: Subject to any disclaimer, the term of this patent is extended or adjusted under 35 U.S.C. 154(b) by 0 days.

(21) Appl. No.: 10/667,132

(22) Filed: Sep. 18, 2003

(65) Prior Publication Data

US 2005/0076102 A1    Apr. 7, 2005

(51) Int. Cl.
*G06F 15/173*    (2006.01)
(52) U.S. Cl. ....................................... 709/224; 709/223
(58) Field of Classification Search ................. 709/203, 709/223, 224; 370/400, 422
See application file for complete search history.

(56) References Cited

U.S. PATENT DOCUMENTS

| | | | |
|---|---|---|---|
| 5,257,390 A | 10/1993 | Asprey | |
| 5,268,676 A | 12/1993 | Asprey et al. | |
| 5,353,409 A | 10/1994 | Asprey et al. | |
| 5,721,842 A | 2/1998 | Beasley et al. | |
| 5,732,212 A | 3/1998 | Perholtz et al. | |
| 5,884,096 A | 3/1999 | Beasley et al. | |
| 5,937,176 A | 8/1999 | Beasley et al. | |
| 5,978,389 A | 11/1999 | Chen | |
| 6,094,681 A * | 7/2000 | Shaffer et al. ................ | 709/224 |
| 6,112,264 A | 8/2000 | Beasley et al. | |
| 6,119,148 A | 9/2000 | Chen | |
| 6,138,191 A | 10/2000 | Fujii et al. | |
| 6,345,323 B1 | 2/2002 | Beasley et al. | |
| 6,347,374 B1 * | 2/2002 | Drake et al. ................. | 713/200 |
| 6,363,421 B2 * | 3/2002 | Barker et al. ................ | 709/223 |
| 6,453,345 B2 * | 9/2002 | Trcka et al. ................. | 709/224 |
| 6,493,755 B1 * | 12/2002 | Hansen et al. .............. | 709/224 |
| 6,505,245 B1 * | 1/2003 | North et al. ................. | 709/224 |
| 6,557,170 B1 | 4/2003 | Wilder et al. | |
| 6,615,272 B1 * | 9/2003 | Ambrose ..................... | 709/238 |
| 6,681,250 B1 * | 1/2004 | Thomas et al. ............. | 709/226 |
| 6,754,854 B2 * | 6/2004 | Kurrasch ..................... | 714/47 |
| 2002/0059412 A1 * | 5/2002 | Azpitarte .................... | 709/223 |
| 2002/0143996 A1 * | 10/2002 | Odryna et al. .............. | 709/246 |
| 2003/0067387 A1 * | 4/2003 | Kwon et al. ................. | 340/540 |
| 2003/0084150 A1 * | 5/2003 | Hansen et al. .............. | 709/224 |
| 2004/0148385 A1 * | 7/2004 | Srinivasan et al. .......... | 709/224 |

OTHER PUBLICATIONS

International Search Report and Written Opinion by the International Searching Authority, issued on Jan. 5, 2005, in the PCT application No. PCT/US04/29638.

* cited by examiner

*Primary Examiner*—William C. Vaugh, Jr.
*Assistant Examiner*—Yemane Mesfin

(57) ABSTRACT

Disclosed is a remote computer or server management system for coupling a series of remote computers to one or more user workstations allowing for efficient location, error detection and/or general status indication of the remote computers or servers. In particular, computer interface modules connected to the remote computers or servers include a signaling circuit to emit an audible or visual signal upon detection of a problem or upon receipt of a signal command from a user trying to locate a particular remote computer. Alternatively, the signaling circuit may transmit a message to the user workstation to inform the user of a problem, general status (e.g., of firmware upgrade), etc., which may be displayed on the user's video monitor.

16 Claims, 9 Drawing Sheets

INTELLIGENT MODULAR SERVER MANAGEMENT SYSTEM FOR SELECTIVELY OPERATING AND LOCATING A PLURALITY OF COMPUTERS

FIELD OF THE INVENTION

The present invention relates generally to a remote computer or server management system for coupling a series of remote computers to one or more user workstations allowing for efficient location, error detection and/or general status indication of the remote computers or servers. In particular, computer interface modules connected to the remote computers or servers include a signaling circuit to emit a signal, which may be an audible or visual signal, upon detection of a problem or upon receipt of a signal command from a user trying to locate a particular remote computer. Alternatively, the signaling circuit may transmit a message to the user workstation to inform the user of a problem, general status (e.g., of firmware upgrade), etc., which may be displayed on the user's video monitor.

BACKGROUND OF THE INVENTION

In a typical computer environment, a Local Area Network (LAN) allows for one or more computer servers to be connected to several computers such that the resources of each server are available to each of the connected computers. In this system, a dedicated keyboard, video monitor and mouse may be employed for each computer and computer server.

To maintain proper operation of the LAN, the system administrator must maintain and monitor the individual computer servers and computers. This maintenance frequently requires the system administrator to perform numerous tasks from the user console located at the server or computer. For example, to reboot a computer or to add or delete files, the system administrator is often required to operate the server or computer from its local user console, which may be located at a substantial distance from the system administrator's computer. Therefore, to accomplish the task of system administration, the system administrator must often travel far distances to access the local user consoles of remotely located servers and computers. As an alternative to physical relocation of the system administrator, dedicated cables may be installed from each remotely located server and computer to the system administrator's user console to allow the system administrator to fully access and operate the remote computer equipment. However, such an alternative requires substantial wiring and wire harnessing, both of which may require tremendous cost. Additionally, as the distance between the system administrator's user console and the remote computer equipment increases, a decrease in the quality of the transmitted signal often results. Thus, dedicated cables between the system administrator's user console and remote computer equipment may not be a feasible alternative.

In addition to system administration, space is also an important concern for many computer networking environments, especially large-scale operations such as data-centers, server-farms, web-hosting facilities, and call-centers. These environments typically require space to house a keyboard, video monitor, and mouse for each piece of computer equipment in addition to all of the wiring required to connect and power these components. Furthermore, space is also required to house all of the network interface wiring. As more equipment is added to a computer network, it becomes more probable that the space required for the equipment and associated cabling will exceed the space allotted for the network. Therefore, network architecture, equipment size and available space are important issues when designing an effective computer network environment.

One method of reducing the amount of space required to house a computer network is to eliminate any equipment (i.e., keyboard, video monitor, cursor control device, etc.) that is not essential for proper operation of the computer network. Elimination of this equipment also eliminates the wiring associated with such equipment. This equipment, and associated wiring, may be eliminated if a system administrator is able to access the remote computers from one user console, thereby eliminating the dedicated equipment and the associated wiring for each remote computer. Elimination of this unnecessary equipment decreases the amount of space required for computer network environments.

A keyboard, video monitor, and mouse ("KVM") switching system may be utilized to allow one or more user workstations to select and control any one of a plurality of remote computers via a central switching unit. Such systems are well known in the art and have been used by system administrators for at least 10 years. Specifically, a KVM switching system allows a system user to control a remote computer using a local user workstation's keyboard, video monitor, and mouse as if these devices are directly connected to the remote computer. In this manner, a system user may access and control a plurality of remote computers, such as servers, from a single location (i.e., the location of the user workstation). The system user may select a specific remote computer to access or control using any one of a variety of methods known in the art including pushing a button on the face of a switching system component that corresponds with the desired remote computer, selecting the computer from a list displayed on a switching system component's LCD or LED display, pressing one or more hot keys on the local user workstation's keyboard (e.g., F1, ALT-F1, F2, etc.), selecting the remote computer from a list displayed on the user workstation's monitor by pointing to it or scrolling to it using the user workstation's keyboard and/or mouse, etc.

However, an additional problem arises in large-scale computer operations where the peripheral equipment is removed from each computer. Since the display unit of each computer is remotely located at a workstation console, it often is difficult for a user to physically locate a desired computer to perform upgrades or maintenance not possible from the user's local keyboard, video, and mouse. A need therefore exists for an alarm and location device which enables users, such as system administrators, to easily locate computers in large-scale operation environments.

The following references, which are discussed below, were found to relate to the field of computer management systems: Asprey U.S. Pat. No. 5,257,390 ("Asprey '390 patent"), Asprey U.S. Pat. No. 5,268,676 ("Asprey '676 patent"), Asprey U.S. Pat. No. 5,353,409 ("Asprey '409 patent), Perholtz et al. U.S. Pat. No. 5,732,212 ("Perholtz"), Chen U.S. Pat. No. 5,978,389 ("Chen '389 patent"), Chen U.S. Pat. No. 6,119,148 ("Chen '148 patent"), Fujii et al. U.S. Pat. No. 6,138,191 ("Fujii"), Beasley U.S. Pat. No. 6,345,323 ("Beasley"), and Wilder et al. U.S. Pat. No. 6,557,170 ("Wilder").

The Asprey '390 patent, filed on Jul. 26, 1991 and issued on Oct. 26, 1993, discloses an extended range communications link for coupling a computer to a mouse, keyboard, and/or video monitor located remotely from the computer. The end of the link that is coupled to the computer has a first signal conditioning network (i.e., a network of circuitry that dampens the ringing and reflections of the video signals and biases them to a selected voltage level) that conditions the keyboard, video monitor and mouse signals. Conditioning the video monitor signals includes reducing their amplitude in order to minimize the amount of "crosstalk" that is induced on the conductors adjacent to the video signal conductors during transmission of the video signals. This first signal conditioning network is coupled to an extended range cable having a plurality of conductors that transmits the conditioned signals and power and logic ground potentials to a second signal conditioning network (i.e., a network of circuitry that terminates the video signals using a voltage divider and amplifies them), which restores the video signals to their original amplitude and outputs them to a video monitor.

The Asprey '676 patent, filed on Mar. 5, 1990 and issued on Dec. 7, 1993, discloses a communications link for use between a computer and a display unit, such as a video monitor, that allows these two components to be located up to three hundred (300) feet apart. An encoder located at the computer end of the communications link receives analog red, green and blue signals from the computer and inputs each signal to a discrete current amplifier that modulates the signal current. Impedance matching networks then match the impedance of the red, green and blue signals to the impedance of the cable and transmit the signals to discrete emitter-follower transistors located at the video monitor end of the cable. These transistors amplify the signal prior to inputting it to the video monitor. Concurrently, the horizontal synchronization signal is inputted to a cable conductor and its impedance is not matched to the impedance of the cable, thereby allowing the conductor to attenuate the horizontal synchronization signal and reduce noise radiation.

The Asprey '409 patent, filed on Jul. 19, 1990 and issued on Oct. 4, 1994, discloses an extended range communications link for transmitting transistor-transistor logic video signals from a local computer to a video monitor located up to a thousand feet (1,000) from the computer. The link includes a first signal conditioning circuit (i.e., a circuit that reduces the amplitude of the video signals, biases them to a selected potential, and applies them to discrete conductors of an extended cable) located at the computer end of the link for conditioning the received signals and transmitting them via the extended cable to a second signal conditioning circuit. The second signal conditioning circuit (i.e., a circuit that utilizes a threshold or pair of thresholds to effect reconstruction of the video signals prior to applying the signals to a video monitor) receives the transmitted video signals prior to inputting them to the video monitor. According to the Asprey '409 patent, performance of this process reduces the appearance of high frequency video noise on the keyboard clock conductor of the transmission cable, thereby preventing keyboard errors.

Perholtz, filed on Jan. 13, 1994 and issued on Mar. 24, 1998, discloses a method and apparatus for coupling a local user workstation, including a keyboard, mouse, and/or video monitor, to a remote computer. Perholtz discloses a system wherein the remote computer is selected from a menu displayed on a standard personal computer video monitor. Upon selection of a remote computer by the system user, the remote computer's video signals are transmitted to the local user workstation's video monitor. The system user may also control the remote computer utilizing the local user workstation's keyboard and monitor. The Perholtz system is also capable of bi-directionally transmitting mouse and keyboard signals between the local user workstation and the remote computer. The remote computer and the local user workstation may be connected either via the Public Switched Telephone System ("PSTN") and modems or via direct cabling.

The Chen '389 patent, filed on Mar. 12, 1998 and issued on Nov. 2, 1999, discloses a device for multiplexing the video output of a plurality of computers to a single video monitor. The system of Chen includes three sets of switches for receiving the red, green, and blue components of the video signals from each computer. To select the video output of a specific computer for display on the video monitor, a user inputs two video selecting signals into a control signal generating circuit. Depending upon the inputted video selecting signals, the control signal generating circuit produces an output signal corresponding to the selected video output. Thereafter, a control signal is generated that indexes the three sets of switches to switch the video signals being output by the desired computer to the single video monitor. The three sets of switches transfer the incoming video signals to three sets of switch circuits and current amplifying circuits that provide input and output impedance matching, respectively. The tuned video signals are then displayed on the single video monitor.

The Chen '148 patent, filed on Jul. 29, 1998 and issued on Sep. 12, 2000, discloses a video signal distributor that receives processes and distributes video signals received from one or more computers to a plurality of video monitors. The video signal distributor includes three transistor-based voltage amplifying circuits to individually amplify the red, green and blue video signals received from each computer prior to transmitting these signals to a video monitor. The video signal distributor also includes a synchronization signal buffering device that receives horizontal and vertical synchronization signals from each computer and generates new synchronization signals based upon the quantity of video signals that are output to the video monitors.

Fujii, filed on Feb. 10, 1998 and issued on Oct. 24, 2000, discloses a system for selectively operating a plurality of computers that are connected to one common video monitor. The Fujii system includes a data input device for entering data in any one of the plurality of connected computers. The system also includes a main control circuit, which is connected to the data input device, and a selection circuit for providing the entered data and receiving the video signals from the selected computer. A user selects a remote computer by supplying the command code associated with the desired remote computer utilizing the keyboard and/or cursor control device. A selection circuit receives the inputted commands and identifies the selected computer. The selection circuit then sends a signal indicative of the selected remote computer to a main control circuit, which interfaces the keyboard, video monitor, and cursor control device to the selected remote computer.

Beasley, filed on Jun. 9, 2000 and issued on Feb. 5, 2002, like Perholtz, discloses a specific implementation of a computerized switching system for coupling a local user workstation, including a keyboard, mouse and/or video monitor, to one of a plurality of remote computers. In particular, a first signal conditioning unit, located at the local user workstation, includes an on-screen programming circuit that displays a menu of connected remote computers on the video monitor of the user workstation. The user selects the desired computer from the list using the local user workstation's keyboard and/or mouse. To activate the menu, a user depresses, for example, the "printscreen" key on the workstation's keyboard. This causes an overlaid video display to appear on the workstation's video monitor that is produced by the onscreen programming circuit. A user may then select a desired remote computer from the overlaid menu.

According to Beasley, the on-screen programming circuit requires at least two sets of tri-state buffers, a single onscreen processor, an internal synchronization generator, a synchronization switch, a synchronization polarizer, and overlay control logic. The first set of tri-state buffers couples the red, green, and blue components of the video signals received from the remote computer to the video monitor. When the first set of tri-state buffers are energized, the red, green, and blue video signals are passed from the remote computer to the workstation's monitor through the tri-state buffers. When the first set of tri-state buffers are not active, the video signals from the remote computer are blocked. Similarly, the second set of tri-state buffers couples the outputs of the single onscreen processor to the leads that connect to the monitor's color inputs. The overlaid video image produced by the onscreen processor, namely a Motorola MC141543 onscreen processor, is limited to the size and quantity of colors that are available with the single onscreen processor. In other words, the Beasley system is designed for one mode of operation in which the overlaid video is sized for a standard size computer monitor and not a wall-size or multiple monitor type video display. When the second set of tri-state buffers is energized, the video output of the on-screen programming circuit is displayed on the workstation's video monitor. When the second set of tri-state buffers is not active, the video output from the on-screen programming circuit is blocked.

The on-screen programming circuit disclosed in Beasley also produces its own horizontal and vertical synchronization signals. To dictate which characters are displayed on the video monitor, the CPU sends instructional data to the onscreen processor. This causes the processor to retrieve characters from an internal video RAM that are to be displayed on the workstation's video monitor.

During operation, a remote computer is chosen from the overlaid video display. Thereafter, the first signal conditioning unit receives keyboard and mouse signals from the workstation and generates a data packet for transmission to a central cross point switch. The cross point switch routes the data packet to a second signal conditioning unit coupled to the selected remote computer. The second signal conditioning unit then routes the keyboard and mouse command signals to the keyboard and mouse connectors of the remote computer. Video signals produced by the remote computer are routed through the second signal conditioning unit, the cross point switch, and the first signal conditioning unit to the video monitor at the local user workstation. The horizontal and vertical synchronization video signals are encoded on one of the red, green or blue video signals to reduce the quantity of cables required to transmit the video signals from the remote computer to the local workstation's video monitor.

Wilder, filed on May 5, 1998 and issued on Apr. 29, 2003, discloses a keyboard, video monitor, mouse, and power ("KVMP") switching system having an on screen display circuit coupled to a user workstation for providing an interface to the KVMP switch. A first set of switching circuits coupled to a plurality of computers and the on screen display circuit allows a user to access and control any of the computers using a keyboard, video monitor, and mouse attached to a user workstation. A second set of switching circuits coupled to the power supply of each computer and the on screen display circuit allows a user to control the electrical power to each computer utilizing an on screen display. To select a remote computer utilizing the Wilder system, a user activates the on-screen display by entering a hot key either with the keyboard and/or cursor control device. The on-screen display initially prompts a user to enter a username and password. Once the user has been verified, the user is provided a menu containing a list of all attached computers and a menu to control the power supply to each computer. The user utilizes the keyboard and/or cursor control device to select the desired remote computer or power settings from the on-screen display menu. Wilder incorporates a single onscreen processor for generation of the remote computer selection menu.

Currently, many methods are known in the art of locating remote objects. Typically, these systems utilize a wireless transmitter device capable of emitting a signal and a responder device that produces an audible tone in response to the signal emitted by the transmitter. These systems are usually utilized to locate commonly misplaced objects. For example, a person may affix a responder device to a set of house keys. If the house keys were ever misplaced, they could easily be located by utilizing the transmitter device to cause the responder device to produce an audible tone. The lost house keys could then easily be found by locating the source of the audible tone. Such references include Anderson et al. U.S. Pat. No. 4,101,873, Kipnis U.S. Pat. No. 5,677,673, Trivett U.S. Pat. No. 6,535,125 and Knaven U.S. Pat. No. 6,501,378.

In view of the foregoing, a need clearly exists for a reliable, efficient, modular, remote computer management and switching system that allows information technology personnel to easily manage, maintain and locate a plurality of computers or servers. Such a system should allow a user to easily locate any one of a plurality of remote computers or servers by selectively causing a signaling circuit in a device attached to the remote computers to emit an audible or visual signal. The system may also be utilized to notify users about the status of an upgrade or other such maintenance tasks. In this manner, it is more efficient for information technology personnel or administrators to be notified of system errors. The system will aid in both small-scale computer centers and large-scale operations such as data-centers, server-farms, web-hosting facilities, and call-centers.

SUMMARY OF THE INVENTION

The present invention relates to a remote computer or server management system for coupling a series of remote computers to one or more user workstations allowing for efficient location, error detection and/or general status indication of the remote computers or servers. In particular, computer interface modules connected to the remote computers or servers include a signaling circuit to emit a signal, which may be an audible or visual signal, upon detection of a problem or upon receipt of a signal command from a user trying to locate a particular remote computer. Alternatively, the signaling circuit may transmit a message to the user workstation to inform the user of a problem, general status (e.g., of firmware upgrade), etc., which may be displayed on the user's video monitor.

In many circumstances, it is desirable to have a computer workstation, which includes peripheral devices such as keyboard, video monitor and cursor control devices, from the computer due to space constraints. However, separating a computer from its peripheral devices may make it difficult to locate a particular remote computer, especially in a room of hundreds or even thousands of computers. Generally, there are no means for differentiating between computers in such an environment without any attached peripheral devices.

The present invention provides a simple and effective means for locating a single remote computer in field of many remote computers in an intelligent, modular computer management system that enables several simultaneous users to access and control these remote computers from one or more user stations. Such a device allows, for example, a system administrator to locate any one of a plurality of remotely located system computers from a user or administrator's station.

The present invention also provides compatibility between various operating systems and/or communication protocols.

The present invention allows the same set of local peripheral devices to access, control, and locate remote computers executing a variety of operating systems and protocols, including but not limited to, those manufactured by Microsoft Corporation (Windows), Apple Computer, Inc. (Macintosh), Sun Microsystems, Inc. (Unix), Digital Equipment Corporation, Compaq Computer Corporation (Alpha), International Business Machines (RS/6000), Hewlett-Packard Company (HP9000) and SGI (formerly "Silicon Graphics, Inc.".

Additionally, local devices may communicate with remote computers via a variety of protocols including, but not limited to Universal Serial Bus ("USB"), American Standard Code for Information Interchange ("ASCII"), and Recommend Standard-232 ("RS-232").

A variety of cabling mechanisms may be used to connect the local user workstations and the remote computers to the computerized switching system of the present invention. Preferably, the present invention incorporates a single Category 5 Universal Twisted Pair ("CAT 5") cable to connect each local user station (each having the necessary peripheral devices) and each remote computer interface modules (each being connected to a remote computer) to the central switch of the system. However, other cabling may be used without departing from the spirit of the present invention.

Furthermore, to achieve the desired administration efficiency, the present invention provides circuitry for locating a specific remote computer, detecting a remote computer or computer interface module error, or identifying some other issue for which a user or administrator should be notified, and alerting (via a visual or audible signal) the administrator or other user of such location, error or other issue. Such an alert may also be utilized to notify a system administrator about the status of common maintenance tasks performed on the remote computer, such a as a firmware upgrade.

Therefore, it is an object of the present invention to provide a remote computer management system that allows a system administrator to efficiently locate a specific remote computer in a field of many computers.

It is another object of the invention to provide a remote computer management system that comprises circuitry for providing an audible or visual signal in response to a user's command or in response to the detection of a remote computer error or in response to detection of maintenance operations such as firmware upgrades to alert the user of such error or maintenance.

It is still another object to provide a remote computer management system that comprises circuitry that provides specific alerts for specific issues. Such a signal may include different colored signals or different audible signals for errors than for maintenance, altering the flashing of visual or audible signals to identify specific errors or maintenance issues, etc.

It is yet another object of the invention to allow information technology (IT) personnel to more efficiently manage a volume of servers for both small-scale and large-scale computer centers such as data-centers, server-farms, web-hosting facilities and call-centers.

In addition, it is an object of the present invention to provide a remote computer management system that minimizes the space required to house the computers, peripheral devices and the overall computer management system while providing means to locate a particular computer at any time.

It is also an object of the present invention to provide a remote computer management system comprising circuitry for providing automatic signal tuning to amplify and condition signals uniformly during transmission over an extended range.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 1:
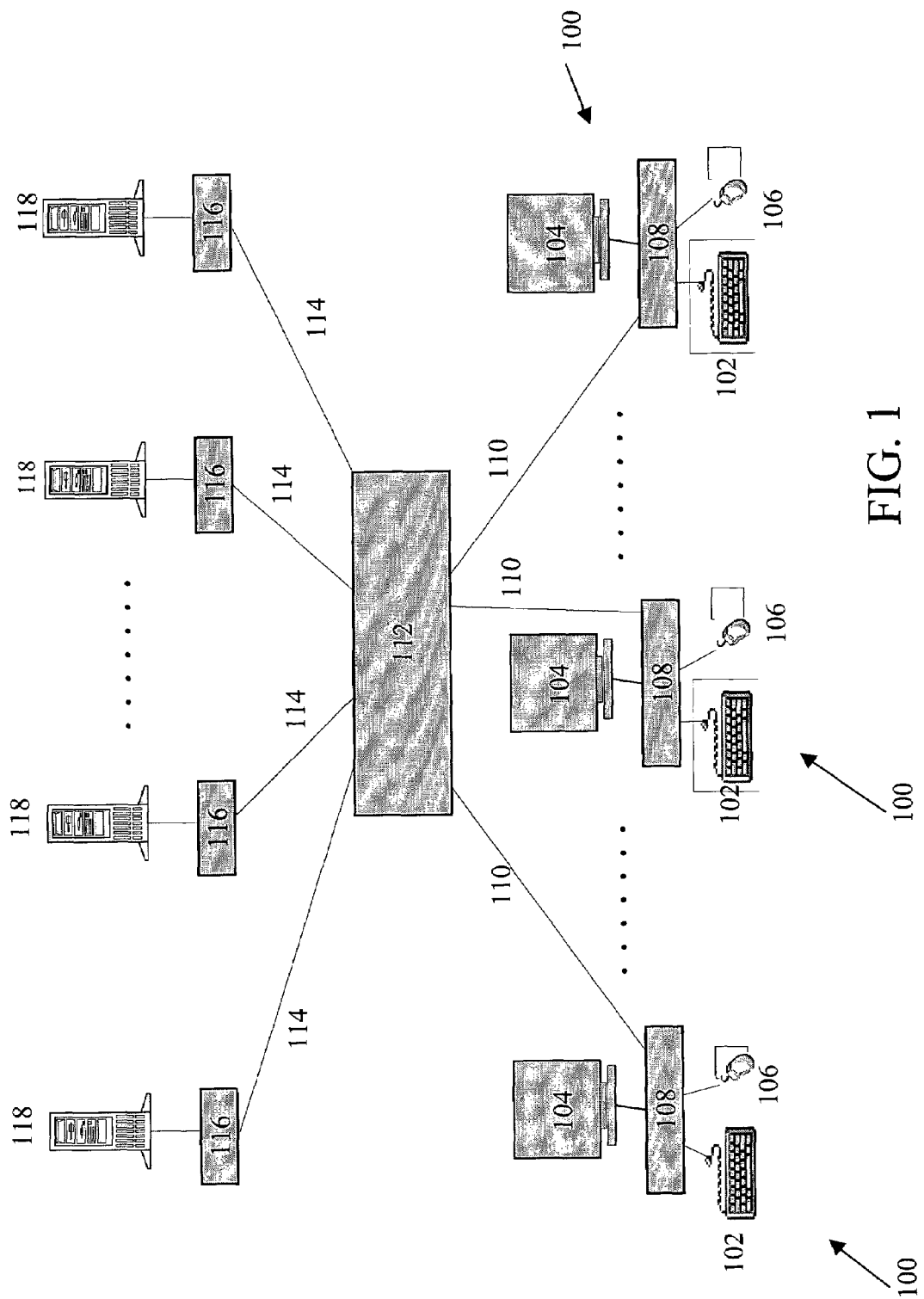
FIG. 1 is a schematic representation of the preferred embodiment of a remote computer management switching system according to the invention illustrating the connection of a plurality of workstations (including a keyboard, video monitor, and cursor control device) with a plurality of remote computers, wherein the system includes a signaling circuit to alert the user to the location, error, maintenance status, etc, of a particular remote computer.

Referring first to FIG. 1, depicted is the architecture of the preferred computer management system in accordance with the present invention. Specifically, a modular, intelligent, computer management system is shown including a centrally located matrix switching unit (MSU) 112, multiple user stations (USTs) 108, having attached keyboards 102, video monitors 104, and cursor control devices 106, and multiple computer interface modules (CIMs) 116 each connected to a remote computer 118. Each UST 108 and each CIM 116 is preferably connected to MSU 112 via cables 110 and 114, respectively, which are preferably Category 5 Universal Twisted Pair (CAT 5) cables.

Although single CAT 5 cabling is the preferred cabling for use with the present invention, other cabling may be used, such as coaxial, fiber optic or multiple CAT 5 cables, depending on the specific needs of the system user. CAT 5 cabling is preferred because it reduces cabling cost while maintaining the strength of signals that are transmitted over extended distances. Additionally, the use of single CAT 5 cabling minimizes the space required to house the computer system and its associated wiring. Alternatively, the cables described for use with the invention may be replaced with a form of wireless communications.

Individual CAT 5 cables may be used for connection of each UST 108 and each CIM 116 to MSU 112. Conventional CAT 5 cables include four (4) twisted pair of wires. The present invention utilizes three (3) of these twisted pair for the transmission of video signals. Each of the three (3) twisted pair transmits one of the three video color signals (i.e., red, green or blue). To allow all video signals to be transmitted via only (3) twisted pair, the horizontal and vertical synchronization signals, which would otherwise require their own twisted pairs, are individually encoded on one of the three color video signals. That is, each synchronization signal is encoded on its own, dedicated color signal. For example, the vertical synchronization signal may be encoded on the blue video signal while the horizontal synchronization signal may be encoded on the green video signal. All other non-video signals such as keyboard, cursor control device, and audio signals, are transmitted via the fourth twisted pair cable.

Cables 110 and 114 are connected to UST 108, MSU 112 and CIM 116 by plugging each end into a RJ-45 connector located on these respective components to be coupled by cables 110 and 114. Although RJ-45 connectors are preferred, other types of connectors may be used, including but not limited to RJ-11, RG-58, RG-59, British Naval Connector ("BNC"), and ST connectors.

The remote computer management system includes local user workstations 100, each preferably comprising dedicated peripheral devices such as keyboard 102, video monitor 104 and/or cursor control device 106. Other peripheral devices may also be located at workstation 100, such as printers, scanners, video camera biometric scanning devices, microphones, etc. Each peripheral device is directly or indirectly connected to UST 108, which is attached to MSU 112 via cable 110. Of course, wireless peripheral devices may also be used with this system. During operation, all electronic signals received at UST 108 from attached peripheral devices are transmitted to MSU 112 via cable 110. Thereafter, the signals are transmitted to the desired CIM 116 via another cable 114. CIM 116, being coupled to a remote computer 118, transmits the received signals to the respective ports of the remote computer 118.

Preferably, each CIM 116 incorporates signaling circuitry that automatically causes CIM 116 to emit an audible or visual signal, for example, to locate a desired remote CIM 116 which may be among hundreds or even thousands of CIMs. Alternatively, the signaling circuitry may enable a user at a user station to cause CIM 116 to emit an audible or visual signal, or to transmit a signal to the user station for display on the user's monitor. This circuitry is also preferably configured to notify the remote user about the status of the remote computer to which the CIM is attached, problems with the remote computer, the need for a firmware upgrade, etc. Notification from the circuitry may take the form of an audible or visual signal at the CIM's location or may include the transmission of signals back to the user station for display on a monitor.

Preferably, CIM 116 is compatible with all commonly used, present day computer operating systems and protocols, including but not limited to those manufactured by Microsoft (Windows), Apple (Macintosh), Sun (Unix), DEC, Compaq (Alpha), IBM (RS/6000), HP (HP9000) and SGI. Additionally, local devices may communicate with remote computers via a variety of protocols including Universal Serial Bus ("USB"), American Standard Code for Information Interchange ("ASCII") and Recommend Standard-232 ("RS-232").

The remote computer management system of the present invention may also be configured to connect varying quantities of user workstations 100 with varying quantities of remote computers 118. Preferably, the system according to the present invention allows eight (8) USTs 108 and thirty-two (32) CIMs to be connected via one MSU 112 while still achieving optimal signal transmission. If additional USTs or CIMs must be added, the system allows a plurality of MSUs 112 to be utilized to connect as many as sixty-four (64) user workstations 100 and ten thousand (10,000) remote computers 118.

Selection of a remote computer 118 from a user workstation 100 may be accomplished with a variety of methods. One such method is choosing a remote computer 118 from a menu or list displayed on the screen of the user station's video monitor 104. Such a menu or list may be generated by an option menu circuit within UST 108. The option menu circuit may be utilized to control the signaling circuitry located within CIM 116. The option menu circuit and display facilitates system programming and provides information useful for system operation. Furthermore, multiple security features such as passwords, system user histories, etc. may be implemented and operated in conjunction with the option menu circuit.

Figure 2A:
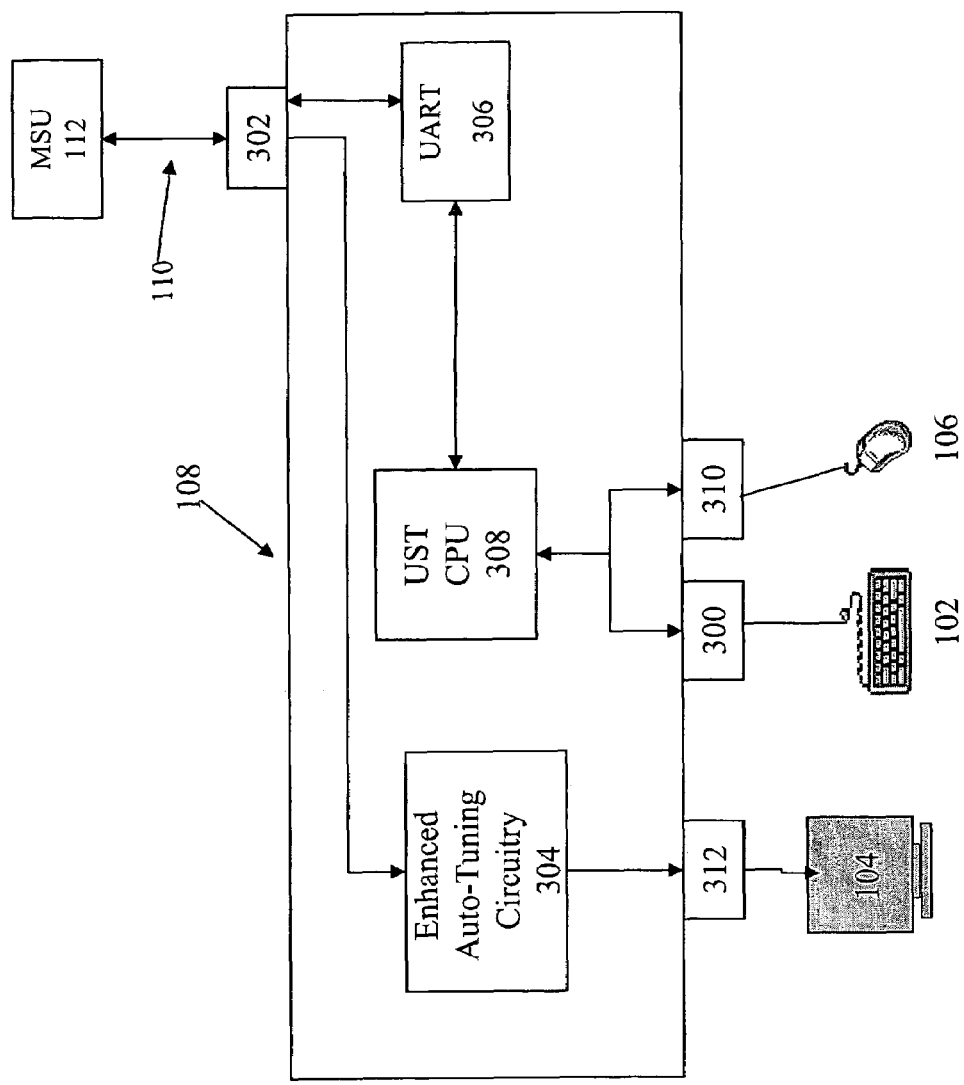
FIG. 2A is a schematic representation of the preferred embodiment of the user station device ("UST") shown in FIG. 1 and its attached peripheral devices, illustrating the internal structure of the UST and its connection to the peripheral devices.

Turning next to FIG. 2A, depicted is a schematic diagram of the preferred internal structure of UST 108 according to the present invention. As shown, UST 108 interfaces keyboard 102, video monitor 104, and cursor control device 106 with MSU 112 for connection to any of a plurality of remote computers (see FIG. 1). Keyboard 102 and cursor control device 106 are connected to keyboard port 300 and cursor control device port 310 of UST 108, respectively, using industry standard connectors and cabling. Wireless keyboards and cursor control devices may also be used. Signals from keyboard 102 and cursor control device 106 generated at the local user workstation are received by UST CPU 308 via keyboard port 300 and cursor control device port 310, respectively. Data packets representing the keyboard and cursor control device information in the received signals are generated by UST CPU 308. The newly generated data packets are transmitted to UART 306, whereupon the data packets are converted to a serial format and transmitted through port 302 to MSU 112 via independent cable 110. It should be noted that the converted data packets may alternatively be transmitted via a wireless connection, thereby eliminating the need for cable 110.

Conversely, keyboard and cursor control device signals received from the remote computer through MSU 112 via cable 110 are received via port 302. Thereafter, UART 306 de-serializes the serial data packet signals and transmits them to UST CPU 308. Alternatively, a non-UART device may be used to de-serialize the received serial data packets. UST CPU 308 then uses the information contained in the data packet signals to emulate keyboard and cursor control device signals. These emulated signals are applied to keyboard 102 and cursor control device 106 via keyboard port 300 and cursor control device port 310, respectively.

Figure 2B:
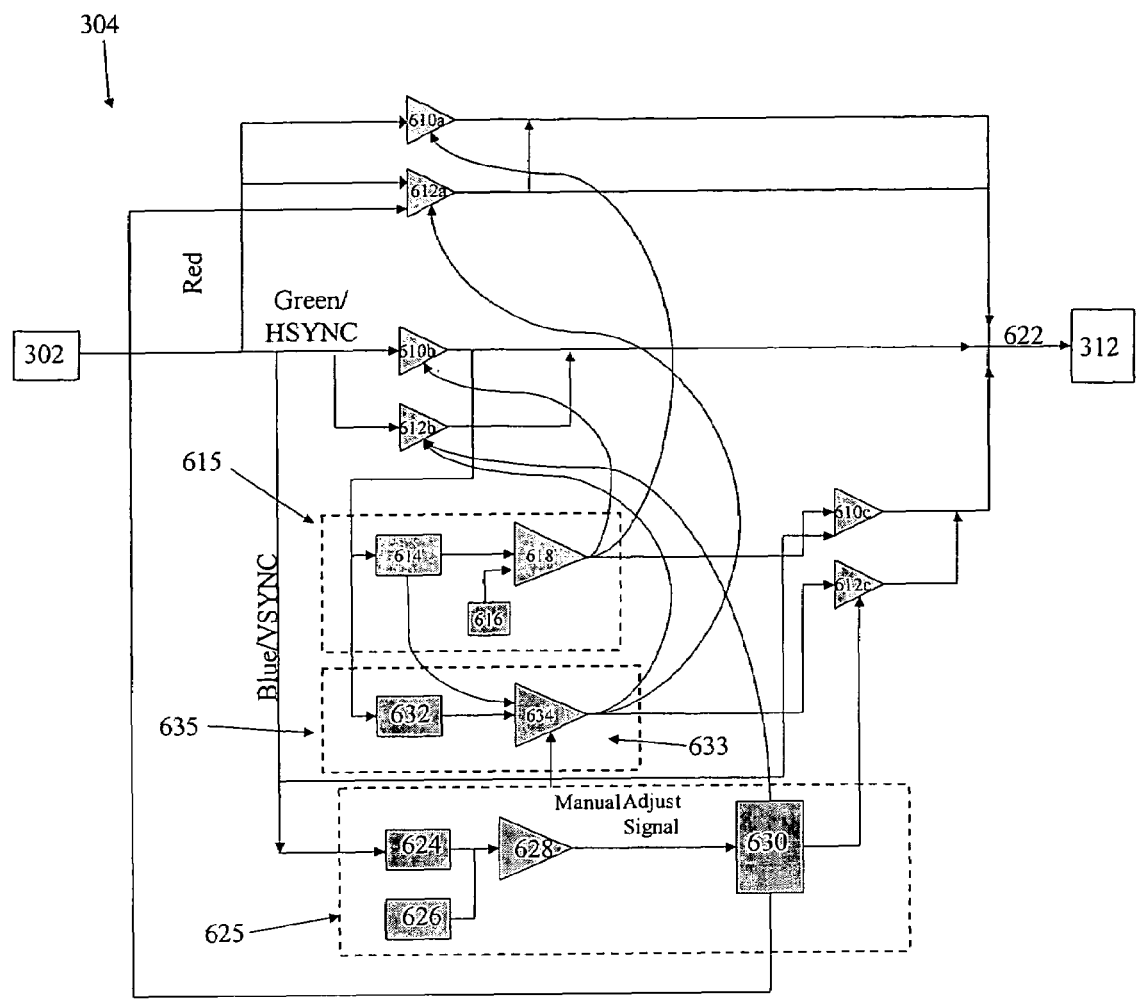
FIG. 2B is a schematic diagram of the preferred embodiment of the automatic tuning circuit contained in the UST of FIG. 2A, which functions to compensate for reduced amplitudes and attenuated frequencies of the transmitted signals.

Unidirectional video signals generated at the remote computer are also received at port 302 from MSU 112 via communication link 110. However, these video signals are transmitted to tuning circuit 304, which conditions the video signals to a desired amplitude and frequency. As shown in FIG. 2B, tuning circuit 304 preferably comprises red variable gain amplifier 610a, green variable gain amplifier 610b, blue variable gain amplifier 610c, red frequency compensation amplifier 612a, green frequency compensation amplifier 612b, blue frequency compensation amplifier 612c, slow peak detector 614, voltage source 616, comparator 618, slow peak detector 624, voltage source 626, comparator 628, video switch 630, fast peak detector 632, and comparator 634.

During operation, the keyboard, video, and cursor control device signals from remote computer 118 are transmitted via communication link 418 to CIM 116 (FIGS. 1 and 4). Thereafter, the video signals and data packets generated by CIM CPU 406 are transmitted from CIM 116 to MSU 112 via communication link 114 (FIGS. 1 and 4). At this point in the video signal transmission, the amplitudes of the transmitted video signals may be significantly reduced while the frequencies of the video signals may be attenuated. Subsequently, the video signals and the signals generated by MSU CPU 212 (FIG. 3) are transmitted from MSU 112 to UST 108, wherein the video signals are conditioned by tuning circuit 304. Tuning circuit 304 is implemented to automatically tune the received signals to achieve the desired amplitude and frequency.

In the preferred embodiment, the horizontal synchronization signal is encoded on and transmitted with the green video signal, and the vertical synchronization signal is encoded on and transmitted with the blue video signal. However, the horizontal and vertical synchronization signals may be encoded on and transmitted with any one of the red, green, or blue video signals. Also, it is preferable that the horizontal and vertical synchronization signals are encoded as negative pulses, since the video signals (i.e., red, green, and blue) are typically positive pulses.

Tuning circuit 304 contains three dedicated signal conditioning circuits (i.e., one for each of the red, blue, and green video color signals), a gain amplification adjustment circuit 615, a frequency compensation amplification adjustment circuit 635, and an additional filtering enablement circuit 625.

In operation, the red component of the video signals is initially transmitted to red variable gain amplifier 610a and red variable frequency compensation amplifier 612a. Preferably, red variable gain amplifier 610a adjusts the amplitude of the red component of the video signals based upon the output of gain amplification adjustment circuit 615. Concurrently, red variable frequency compensation amplifier 612a adjusts the frequency of the red component of the video signals based upon the output of frequency compensation amplification adjustment circuit 635. The outputs of red variable gain amplification circuit 610a and red frequency compensation circuit 612a are electrically combined and transmitted via wire 622 to video port 312 for transmission to video monitor 104.

The green component of the video signals, with the encoded horizontal synchronization signal, is initially transmitted to green variable gain amplifier 610b and green variable frequency compensation amplifier 612b. The two outputs are then electrically combined and transmitted to gain amplification adjustment circuit 615 and frequency compensation amplification adjustment circuit 635. Gain amplification circuit 615 comprises slow peak detector 614 that receives the electrically combined outputs of green variable gain amplifier 610b and green variable frequency compensation amplifier 612b. Slow peak detector 614 detects the amplitude of the horizontal synchronization signal, which is encoded on the green component of the video signals, and transmits a signal representing this amplitude to comparator 618 and comparator 634. Comparator 618 then compares the signal received from slow peak detector 614 to a constant reference voltage supplied by voltage source 616. The signal supplied by voltage source 616 represents the desired amplitude for the horizontal synchronization signal. Next, comparator 618 transmits a signal to red variable gain amplifier 610a, green variable gain amplifier 610b, and blue variable gain amplifier 610c to adjust the level of amplification of the red, green, and blue components of the video signals until the desired amplitude is achieved.

Similarly, green variable frequency compensation amplifier 612b adjusts the level of amplification of the frequency of the horizontal synchronization signal based upon the output of frequency compensation amplification adjustment circuit 635. Frequency compensation amplification adjustment circuit 635 comprises fast peak detector 632 that also receives the electrically combined outputs of green variable gain amplifier 610b and green variable frequency compensation amplifier 612b. Fast peak detector 632 detects the rising edge of the horizontal synchronization signal and transmits a signal representing this rising edge to comparator 634. Then, comparator 634 compares the signal received from fast peak detector 632 to the output of slow peak detector 614 to compare the amplitude of the rising edge of the horizontal synchronization signal pulse to the amplitude of the horizontal synchronization signal pulse itself. Next, comparator 634 sends a signal that is fed to red variable frequency compensation amplifier 612a, green variable frequency compensation amplifier 612b, and blue variable frequency compensation amplifier 612c to adjust the level of amplification of the red, green, and blue components of the video signals until the desired frequency is achieved. Optionally, the signal transmitted by comparator 634 may be manually adjusted using manual input 633 by a system administrator (e.g., using the option menu discussed above or controls located on the exterior of the UST). Such a feature would allow the system user to manually "tweak" the gain of the video signals until a desired video output is achieved.

The blue component of the video signals, along with the encoded vertical synchronization signal, is initially transmitted to blue variable gain amplification circuit 610c, blue variable frequency compensation circuit 612c, and filtering enablement circuit 625, which is employed to increase the range of red variable frequency compensation amplifier 612a, green variable frequency compensation amplifier 612b, and blue variable frequency compensation amplifier 612c when the video signals have been transmitted over approximately four hundred fifty (450) feet. The vertical synchronization signal, which is encoded on the blue component of the video signals as a precise square wave signal of known duration and amplitude, is used as a precise reference point for filtering enablement circuit 625. The blue component of the video signals and the encoded vertical synchronization signal are received by slow peak detector 624, which detects the amplitude of the vertical synchronization signal. Slow peak detector 624 transmits a signal representing the amplitude of the vertical synchronization signal to comparator 628, which compares it to the known amplitude of a similar signal transmitted for four hundred fifty (450) feet. This known amplitude is represented by a constant reference voltage applied to comparator 628 by voltage source 626. If comparator 628 determines that the vertical synchronization signal (and therefore all of the video signals) have been transmitted over four hundred fifty (450) feet, a signal indicating this is transmitted to video switch 630. Video switch 630 then sends a signal to red variable frequency compensation amplifier 612a, green variable frequency compensation amplifier 612b, and blue variable frequency compensation amplifier 612c to increase the range of each frequency compensation amplifier 612a, 612b, and 612c.

Subsequent to amplification by gain amplification adjustment circuit 615 and the frequency compensation by frequency compensation amplification adjustment circuit 635, the conditioned red, green, and blue components of the video signals are transmitted via port 312 for display on video monitor 104.

Figure 3:
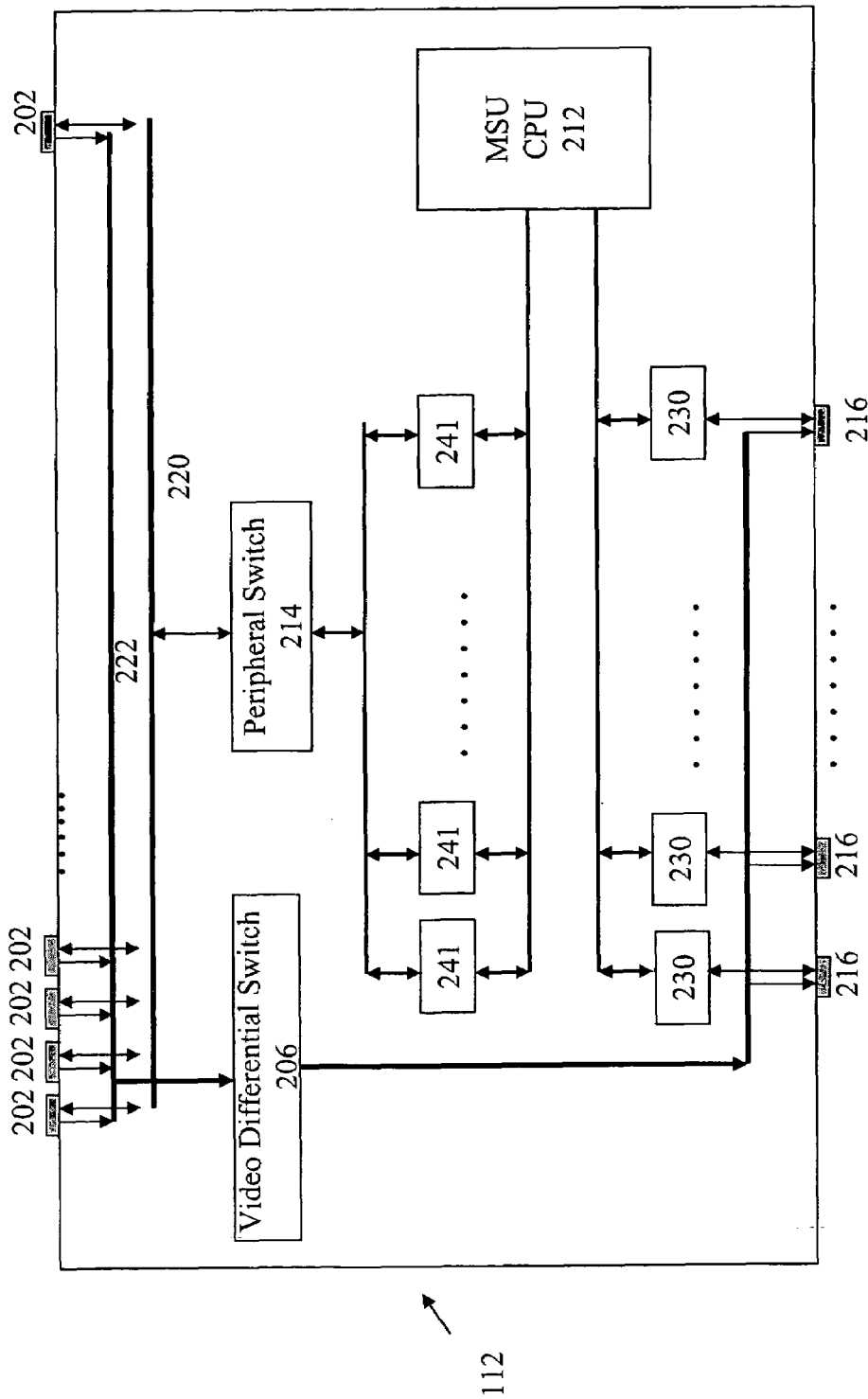
FIG. 3 is a schematic representation of the preferred embodiment of the matrix switching unit ("MSU") shown in FIG. 1 illustrating via a block diagram the internal structure of the MSU and its ports for any connecting cables.

Turning next to FIG. 3, depicted is a schematic representation of the preferred embodiment of MSU 112. According to the invention, MSU 112 enables multiple users to access and operate a plurality of remote computers. Access by a user to one of the remote computers from a local user workstation is performed completely via one or more MSUs 112, independent of any network that may couple the remote computers to each other such as a Local Area Network, Wide Area Network, etc. In other words, the computer management system of the present invention does not utilize an existing computer network to allow a local user workstation to control the remote computers. Rather, all physical connections between the local user workstation and the remote computers occur through MSU 112.

In the preferred embodiment, MSU 112 comprises a plurality of CIM ports 202 that are preferably RJ-45 sockets, which allow each CIM 116 to be connected to MSU 112 via an independent communication link 114 (FIG. 1). The uni-directionally transmitted (i.e., from the remote computer to the user workstation only) video signals are received at MSU 112 through CIM ports 202 onto video bus 222, whereupon the video signals are transmitted to video differential switch 206. Video differential switch 206 is capable of transmitting any video signals received from video bus 222 to any UST port 216. The transmitted video signals are then transmitted via independent communication link 110 to attached UST 108 (FIG. 1).

In addition to transmitting the unidirectional video signals, MSU 112 bi-directionally transmits keyboard and mouse signals between USTs 108 and CIMs 116 (FIG. 1). When transmitting the signals from one CIM 116 to one UST 108, these signals are received through CIM ports 202 on peripheral bus 220, whereupon they are transmitted to peripheral switch 214. Thereafter, peripheral switch 214 transmits these signals to the appropriate CIM universal asynchronous receiver transmitter ("UART") 241, which de-serializes the signals (i.e., converts the signals from a serial format to a format that is compatible with the MSU CPU 112, e.g., parallel format) and transmits them to central MSU processing unit ("CPU") 212. MSU CPU 212 analyzes the received signals and generates a new data packet based upon command information contained within the received signals. The new data packet is transmitted to the appropriate UST UART 230. UST UART 230 then serializes the signals and transmits them to the appropriate UST port 216 for transmission via independent communication link 110 to the appropriate UST 108 (FIG. 1).

Conversely, MSU 112 also transmits keyboard and mouse signals received at one UST 108 to one CIM 116 connected to a remote computer 118 (FIG. 1). In this aspect, the keyboard and mouse signals are received at UST 108 and transmitted via communication link 110 to the respective UST port 216 located at MSU 112. Thereafter, these signals are transmitted to UST UART 230, which de-serializes the signals and transmits them to MSU CPU 212. MSU CPU 212 interprets the information contained in the data packets of the received signals to create new signals, which also represent newly generated data packets. These new signals are then transmitted to the CIM UART 241 that is associated with the desired remote computer 118. CIM UART 241 serializes the signals and transmits them to peripheral switch 214, which transmits the signals to the desired CIM port 202 via peripheral bus 220. Subsequently, the keyboard and mouse signals are transmitted via communication link 114 to the appropriate CIM 116, which is connected to the desired remote computer 118 (FIG. 1).

Figure 4A:
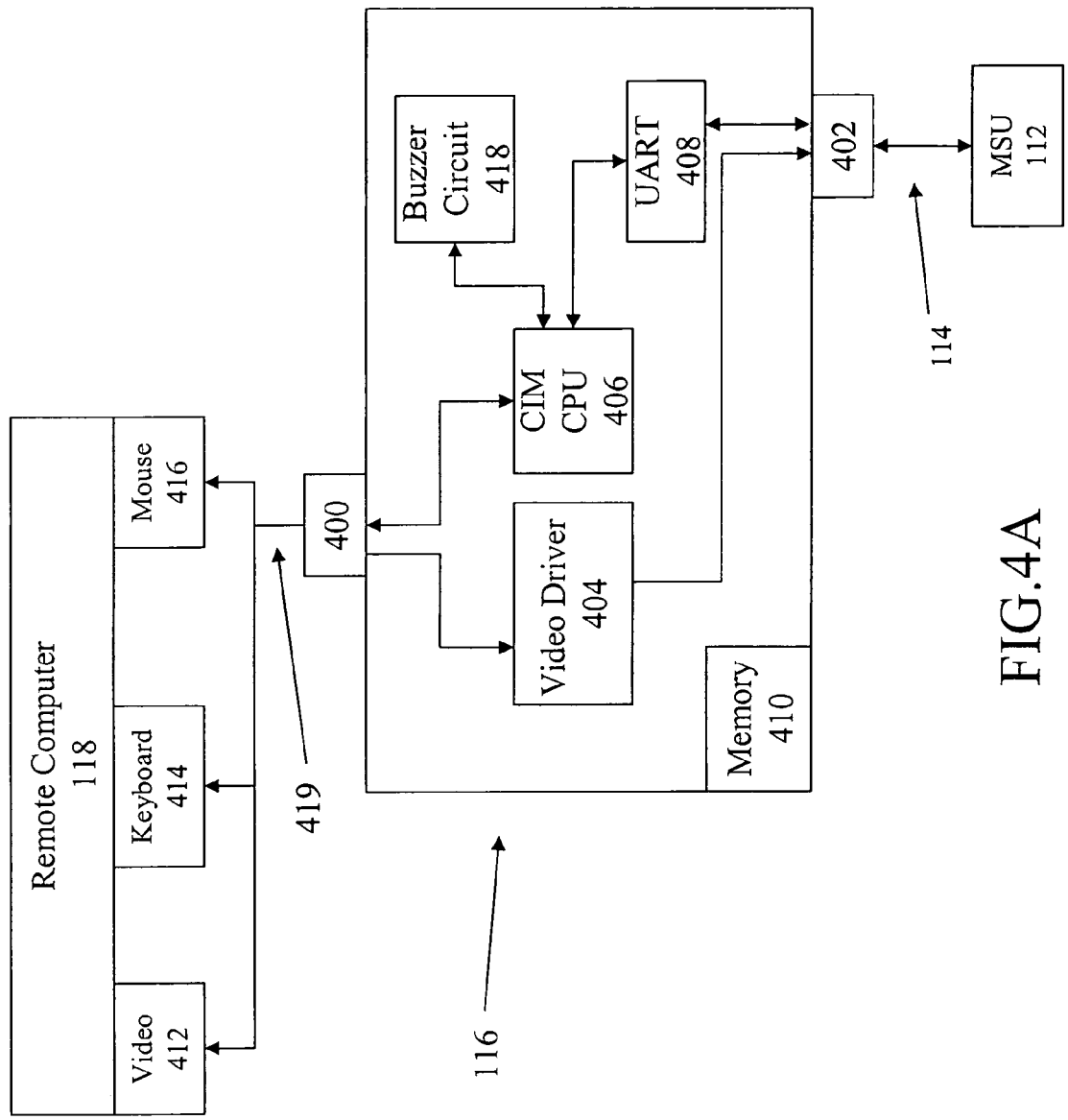
FIG. 4A is a schematic representation of the preferred embodiment of the computer interface modules ("CIMs") shown in FIG. 1 illustrating the internal structure of the CIM including circuitry utilized for the remote location, alert and management features of the present invention.

Turning next to FIG. 4A, shown is a schematic diagram of CIM 116. Preferably, each CIM 116 contains signaling circuit 418 which enhances remote administration by allowing a remote user to easily locate a particular CIM and remote server in an extensive server farm. The signaling circuit may be used for other administrative functions such as notifying a user about the status of a firmware upgrade, detecting malfunctions, etc.

CIM 116 may be compatible with any present day computer system, including but not limited to those manufactured by Microsoft (Windows), Apple (Macintosh), Sun (Unix), DEC, Compaq (Alpha), IBM (RS/6000), HP (HP9000) and SGI. However, it is foreseeable that the technology of the present invention will also be compatible with those computer systems not yet contemplated.

CIM 116 interfaces video port 412, keyboard port 414 and cursor control device port 416 of remote computer 118 to MSU 112 via cabling 419 and port 400. CIM 116 transmits video signals uni-directionally from remote computer 118 to MSU 112. However, as previously discussed, keyboard and cursor control device signals may be transmitted bi-directionally between remote computer 118 and MSU 112.

During operation, video signals are transmitted from video port 412 of remote computer 118 to port 400 of CIM 116 via cabling 419. From port 400, the unidirectional video signals are transmitted to video driver 404, which converts the standard red, green and blue video signals to a differential signal for transmission through port 402 to MSU 112 via cable 114. Each color signal is transmitted via its own twisted pair of wires contained within cable 114 (when transmitted from CIM 116 to MSU 112) or cable 110 (when transmitted from MSU 112 to UST 108) (FIG. 1). Furthermore, video driver 404 appends the horizontal and vertical synchronization signals to one of the red, green or blue video signals to allow all five components of the video signals to be transmitted via only three twisted pairs of wires of cables 110 or 114. That is, the horizontal and vertical synchronization signals are each transmitted on its own color signal—not the same color signal.

In contrast, keyboard and cursor control device signals generated at remote computer 118 are received by CIM CPU 406 from keyboard port 414 and cursor control device port 416, respectively via cabling 419 to port 400. Data packets representing the keyboard and cursor control device information in received signals are generated by CIM CPU 406. The newly generated data packets are transmitted to UART 408, which serializes the signals and transmits them via cable 114 to MSU 112 through port 402.

Figure 4B:
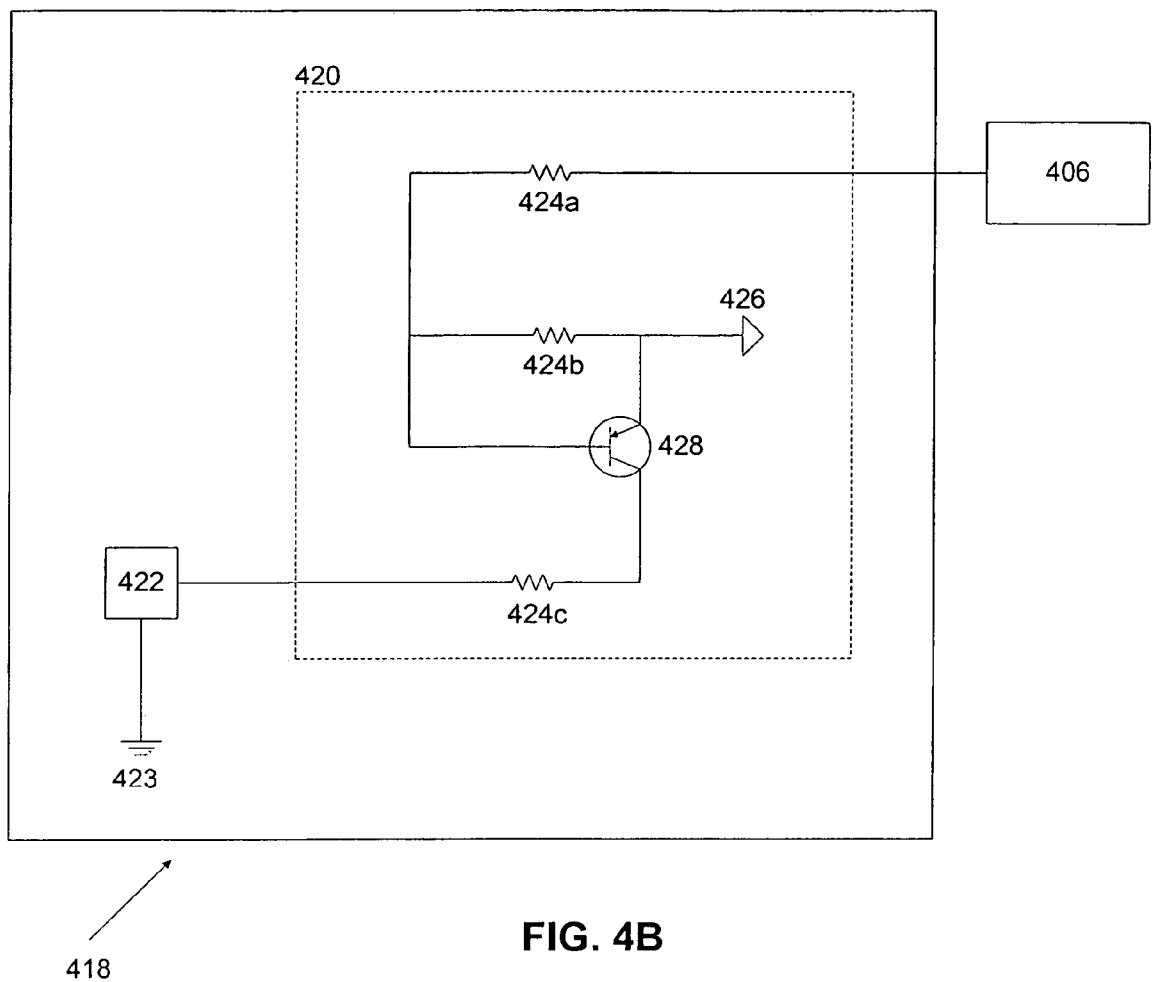
FIG. 4B is a circuit diagram of the preferred embodiment of the signaling circuit contained within the CIM for performing the remote location and alert functions in accordance with the present invention.

If the keyboard and cursor control device signals comprise a signaling control signal, CIM CPU 406 causes signaling circuit 418 to emit an audible or visual signal. That is, CIM CPU 406 contains all the required firmware to control signaling circuit 418. Preferably, as shown in FIG. 4B, signaling circuit 418 comprises amplification circuit 420, signaling device 422, and ground 423. A signaling circuit control signal received from CIM 406 is transmitted to amplification circuit 420 where the signal is amplified utilizing a transistor amplification circuit comprising resistors 424a, 424b and 424c, voltage source 426, and transistor 428. By utilizing proper combinations of resistances for resistors 424a, 424b, and 424c and voltage value for voltage source 426, the signaling circuit control signal achieves the desired amplification. The amplified control signal is then sent to signaling device 422 which emits an audible or visual signal in response. Signaling circuit 418 is completed by ground connection 423.

In the preferred embodiment, the signaling circuit control signal is a 2.7 kHz square wave, which causes signaling circuit 418 to emit the audible or visual signal. However, the signaling circuit control signal may be a waveform of any frequency or shape sufficient to cause signaling 422 to emit an audible or visual signal. Alternatively, the frequency or shape may be specifically chosen to emit a particular audible or visual signal from signaling device 422.

Signaling circuit 418 may be utilized for a number of useful functions. If a remote user wishes to locate a certain remote computer with an attached CIM 116, the user utilizes the keyboard and/or cursor control device to send a signaling circuit control signal to the desired remote CIM 116, thereby causing signaling circuit 418 to emit an audible or visual signal. The user may then locate the remote CIM 116 by locating the source of the audible signal produced by signaling circuit 418.

Signaling circuit 418 may also be utilized to notify a remote user of the status of a user initiated CIM firmware upgrade. As an example, signaling circuit 418 may initially beep or flash slowly during the early phases of a firmware upgrade and beep or flash more frequently as the firmware upgrade nears completion. To indicate the end of the firmware upgrade, signaling circuit 418 may produce a pre-programmed series of beeps or flashes to indicate completion of the upgrade. If the firmware upgrade is unsuccessful, signaling circuit 418 may beep continuously until a user completes the firmware upgrade. CIM CPU 406 may also include firmware that causes signaling circuit 418 to produce an audible or visual signal in the event that CIM 116 experiences an error (e.g., the computer locks up).

Furthermore, signaling circuit 418 may be controlled utilizing an on-screen menu accessible at the remote user station. Access to the control of signaling circuit 418 may optionally be password protected.

Conversely, keyboard and cursor control device signals received from the local user workstation through MSU 112 and cable 114 (FIG. 1) are received via port 402. UART 408 de-serializes the serial data packet signals and transmits them to CIM CPU 406. Alternatively, the received data packet signals may be de-serialized by a non-UART device. CIM CPU 406 uses the information contained in the data packet signals to emulate keyboard and mouse signals. These emulated signals are applied to keyboard port 414 and mouse port 416 through port 400 via cabling 419.

Furthermore, CIM 116 contains memory unit 410, which stores identification information for CIM 116 and its connected remote computer 118 including their assigned name, group, address, etc. Thus, if a specific remote computer 118 is not functioning properly, it is easy to assess which remote computer 118 has malfunctioned. In addition, the CIM address facilitates proper transmission of the keyboard and mouse signals since the address of the desired CIM 116 is included in the keyboard and mouse data packets that are generated by MSU CPU 212. For example, if CIM 116 receives a data packet containing an address other than the CIM's address, the data packet may be returned to MSU CPU 212 for retransmission to the proper CIM 116. Furthermore, memory unit 410 allows CIM 116 and its connected remote computer 118 to be easily identified even if it is relocated and/or connected to a new MSU 112 or a new port of the same MSU 112. Upon reconnection of CIM 116, MSU 112 reads the identification information stored in the CIM's memory unit 410. This information allows MSU 112 to reconfigure or update the location of CIM 116, which ensures that the system continues to properly route information to CIM 116. This feature allows system administrators to easily re-organize CIMs 116 and remote computers 118 without re-programming the system.

Finally, in the preferred embodiment of the present invention, remote computer 118 provides power to CIM 116, thereby eliminating the equipment, cabling and space required for a dedicated CIM power source.

Figure 5:
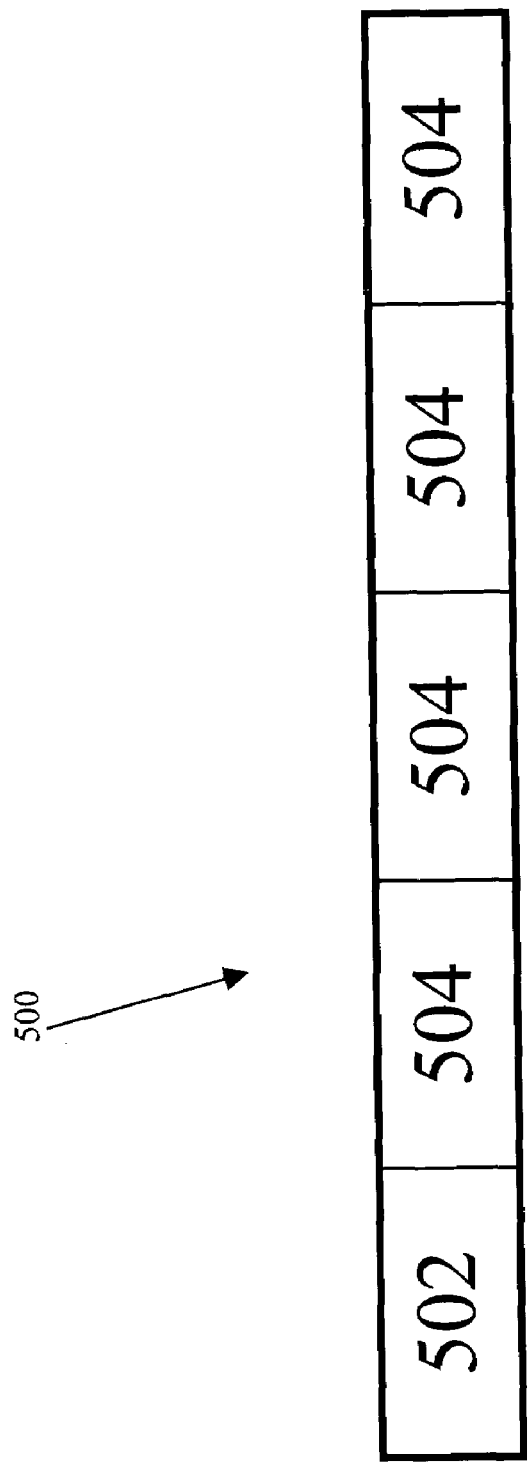
FIG. 5 is a diagram of a data packet used to transmit data in the system according to the invention.

Referring next to FIG. 5, provided is an example of a data packet used to transmit keyboard and mouse information. In the example, protocol data packet 500 consists of five bytes. First byte 502 comprises the instructional, or command, data and data regarding the total length of data packet 500. That is, the first half of first byte 502 contains the command data and the second half of first byte 502 contains the length data. The subsequent four bytes 504 include the characters typed on keyboard 102 and clicks performed with cursor control device 106 (FIG. 1).

It is well known in the art to transmit command and length data in separate bytes. Therefore, utilizing conventional data packet technology, the data packet of the present invention would need to contain six bytes (i.e., one byte for command data, one byte for length data and four bytes for system data). In contrast, the preferred embodiment of the present invention minimizes the size of the data packet by combining the command and length data into one byte, thereby allowing four bytes of system data to be transmitted in a five-byte data packet. Consequently, signal transmission in the intelligent, modular server management system of the present invention is more efficient, allowing a single CAT 5 cable to be used for transmission of keyboard, mouse and video signals.

Figure 6:
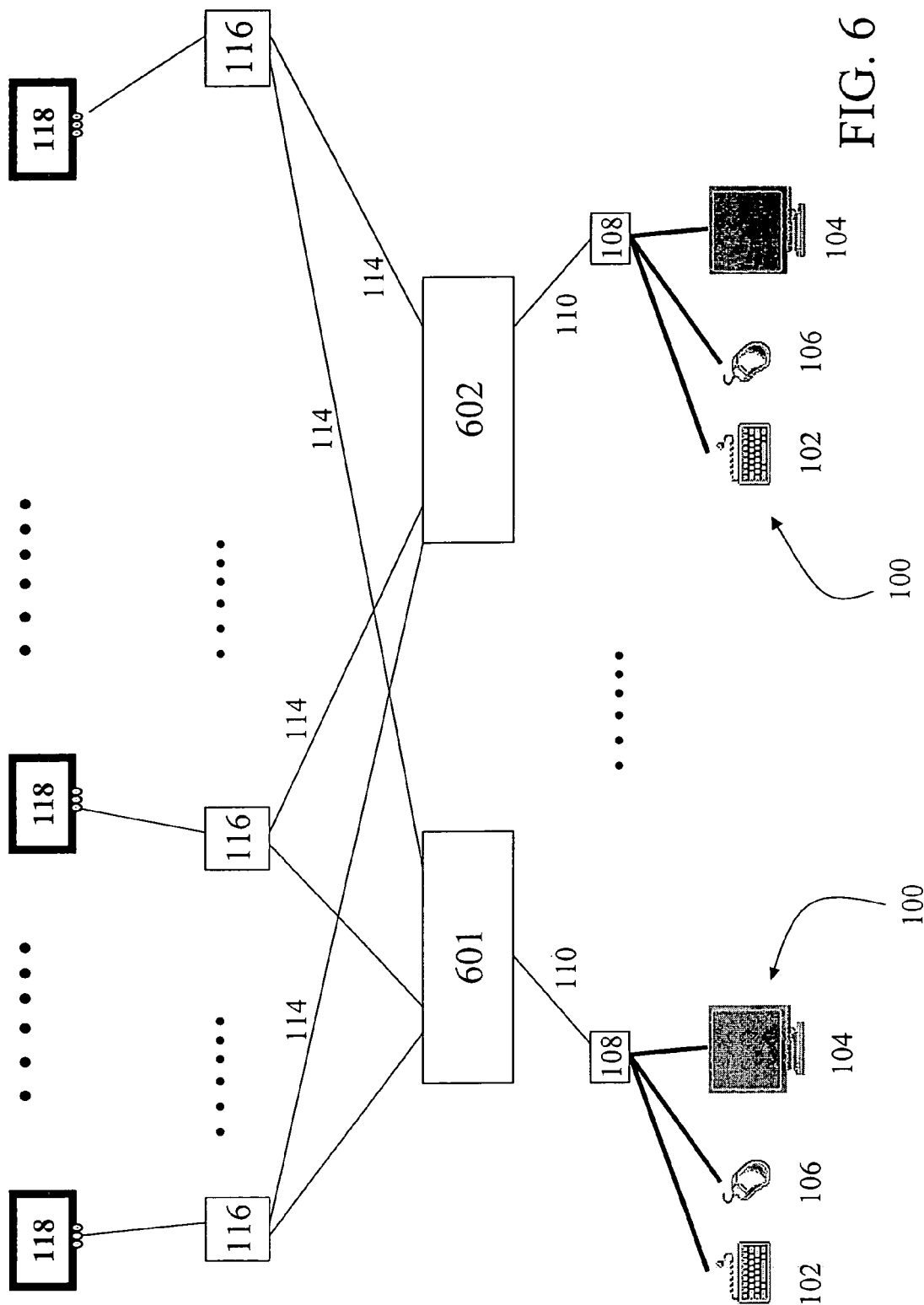
FIG. 6 is a schematic representation of an alternate configuration of a remote computer management system according to the present invention illustrating connection of sixteen (16) user workstations and multiple remote computers to two MSUs for accommodating as many as thirty-two (32) remote computers.

Referring next to FIG. 6, disclosed is an alternate embodiment of the intelligent, modular computer management system of the present invention in which the system is expanded to include two MSUs 112 (shown as first MSU 601 and second MSU 602), each having eight (8) inputs and thirty-two (32) outputs. This configuration allows sixteen (16) USTs 108 to access and operate thirty-two (32) remote computers 118. In this alternate embodiment, each UST 108 may be linked to either first MSU 601 or second MSU 602 via cable 110. All signals received at UST 108 are transmitted via its connected MSU (i.e., either first MSU 601 or second MSU 602) to CIM 116 that is connected to the desired remote computer 118. In this alternate embodiment, CIM 116 provides interfaces for two (2) single CAT 5 cables 114 to allow it to connect to both first MSU 601 and second MSU 602. Thus, this embodiment allows sixteen (16) user stations 100 to operate thirty-two (32) remote computers 118. In addition, this embodiment allows two (2) user workstations 100 to simultaneously access and operate the same remote computer 118. Alternatively, this embodiment allows a first user workstation 100 to inform a second user workstation 100 that a remote computer 118 is in use and, therefore, access to it is restricted.

Figure 7:
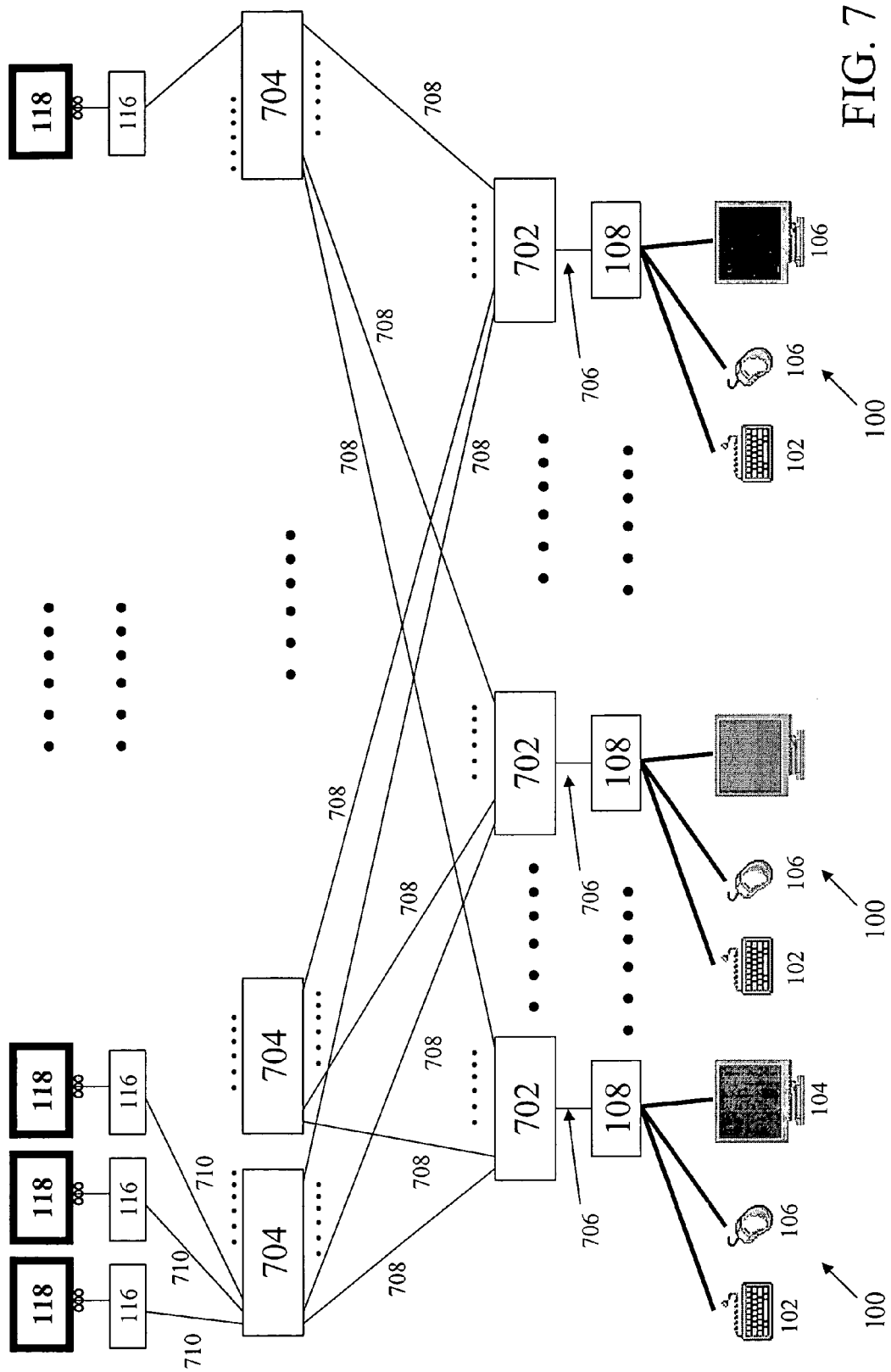
FIG. 7 is a schematic representation of yet another alternate configuration of a remote computer management system in accordance with the present invention illustrating connection of multiple user workstations and multiple remote computers to multiple MSUs for accommodating as many as sixty-four (64) user workstations and ten thousand (10,000) remote computers.

Referring next to FIG. 7, disclosed is another alternate embodiment of the intelligent, modular server system of the present invention. The use of forty (40) total MSUs (i.e., eight (8) first tier MSUs 702 and thirty-two (32) second tier MSUs 704), wherein each first tier MSU 702 and second tier MSU 704 has eight (8) inputs and thirty-two (32) outputs, allows sixty-four (64) user workstations 100 to operate and access one thousand twenty four (1,024) remote computers 118. In this alternate embodiment, each UST 108 is directly linked to one of eight (8) first tier MSUs 702 via single CAT 5 cable 706. First tier MSU 702 routes all signals received from user workstation 100 via single CAT 5 cable 708 to second tier MSU 704 that is connected to the CIM 116 associated with the desired remote computer 118. Second tier MSU 704 then routes the received signals to the respective CIM 116 via single CAT 5 cable 710, whereupon CIM 116 applies these signals to the respective ports of remote computer 118. In this embodiment, the second tier of MSUs 704 comprises thirty-two (32) units. Each second tier MSU 704 is coupled to multiple CIMs 116, which provide a direct interface to each of the one thousand twenty four (1,024) potential remote computers 118 via single CAT 5 cables 710.

Although FIG. 7 depicts the configuration used to access and control one thousand twenty four (1,024) remote computers 118 from sixty-four (64) user workstations 100, many other system configurations are available to allow a greater number of user workstations 100 to be connected to a greater number of remote computers 118. For example, the number of MSU tiers may be increased, or, alternatively, hubs may be incorporated. Also, the MSUs may be designed to comprise more than eight (8) inputs and more than thirty-two (32) outputs.

Alternatively, in accordance with the present invention, the signaling circuitry of the present invention may be employed in further configurations of remote computer management systems. For example, such a system may comprise a "switch less" KVM solution that enables access and control of multiple servers from a single user console (keyboard, monitor, and cursor control device) without the traditional KVM switch box and all the usual switch-to-server cables. Such a system comprises a chain-like server-to-server arrangement including only two basic components: a user station and computer interface modules (CIMs). The CIMs are connected to the keyboard, video, and cursor control devices of each server and are connected to each other with CAT 5 cables and transmit the keyboard, video, and mouse signals directly to the user station. In such an embodiment, the signaling circuit is structured and functions in the same manner as described above.

While the present invention has been described with reference to the preferred embodiments and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

We claim:

1. A remote computer management system comprising:
   a plurality of remote computers;
   at least one user interface unit coupled to a keyboard, video monitor and cursor control device, said user interface unit comprising circuitry for receiving and transmitting keyboard, cursor control device and video signals, wherein, said circuitry for receiving and transmitting video signals includes a tuning circuit containing a plurality of conditioning circuits for providing automatic signal tuning to the video components to uniformly amplify and condition the signals and to automatically tune the frequency of the received signals to achieve a desired video signal amplitude and frequency suitable for transmissions over extended lengths; and
   a plurality of computer interface units, each of said computer interface units being a standalone unit that is co-located with and coupled to one of the plurality of remote computers in a one to one relationship, and wherein each of said computer interface units comprises circuitry for receiving and transmitting keyboard, cursor control device and video signals, and a signaling circuit for generating at least an audible or visual signal upon detection of a specific event transpiring at the remote computer, said signal being generated and broadcast at both the coupled computer interface unit and said remote computer coupled to said computer interface unit; and
   a computer management unit which bi-directionally communicates with said user interface unit and each of said computer interface units;
   wherein said computer interface unit bi-directionally communicates with said user interface unit over a network.

2. A system according to claim 1, wherein said signaling circuit produces a first response in response to said signaling circuit signal and a second response to a second signaling circuit signal.

3. A system according to claim 1, wherein said signaling circuit signal is produced in response to a hardware or software failure on said remote computer.

4. A system according to claim 1, wherein said signaling circuit signal is produced in response to a firmware upgrade on said remote computer.

5. A system according to claim 1, wherein said signaling circuit signal is produced in response to the completion of a firmware upgrade on said computer interface unit.

6. A system according to claim 1, wherein said signaling circuit signal indicates the status of an upgrade to said remote computer.

7. A system according to claim 1, wherein said computer management unit is coupled to each of said computer interface units and enables bi-directional communication among said user interface units and said remote computers.

8. A system according to claim 1, wherein said user interface unit sends a request to said computer interface unit via said computer management unit.

9. A system according to claim 8, wherein said signaling circuit signal is generated in response to said request.

10. A system according to claim 1, wherein said signaling circuit signal is transmitted to said user interface unit, which displays a notification message on said video monitor upon receipt of said signaling circuit signal.

11. A remote device management system comprising:
a plurality of remote interface modules, each said remote interface module being a standalone unit for physically connecting to keyboard, cursor control device and video cables of one of a plurality of remote devices and for receiving and transmitting keyboard, cursor control device and video signals, each remote interface module being co-located with a corresponding remote device;
a signaling circuit within each of said remote interface modules responsive to a signaling circuit control signal, wherein said signaling circuit is capable of generating a signal in response to said signaling circuit control signal; and wherein a audible or visual signal is generated at said connected remote interface module and at the at least one user interface device;
at least one management unit coupled to each of said remote interface modules; and
at least one user interface device coupled to a keyboard, cursor control device, and video monitor for receiving and transmitting keyboard, cursor control device and video signals;
wherein said user interface device contains circuitry for receiving and transmitting video signals, said circuitry including a tuning circuit containing a plurality of conditioning circuits for providing automatic signal tuning to the video components to uniformly amplify and condition the signals and to automatically tune the received signals to achieve a desired video signal amplitude and frequency suitable for transmissions over extended lengths and, wherein said user interface device is also capable of producing said signaling circuit control signal; and
wherein each said remote interface module is connected via a single network cable to said management unit.

12. A system according to claim 11, wherein said response signal indicates the status of said remote devices.

13. A system according to claim 11, wherein said response signal indicates the status of said remote interface modules.

14. A system according to claim 11, wherein said response signal is transmitted to said user interface device and upon receipt of said response signal, a status message is displayed on said video monitor.

15. A remote computer management system comprising:
a plurality of remote computers;
at least one user interface unit coupled to a keyboard, video monitor and cursor control device, said user interface unit comprising circuitry for receiving and transmitting keyboard, cursor control device and video signals;
wherein, said circuitry for receiving and transmitting video signals includes a tuning circuit containing a plurality of conditioning- circuits for providing automatic signal tuning to the video components to uniformly amplify and condition the signals and to automatically tune the received signals to achieve a desired video signal of amplitude and frequency suitable for transmissions over extended lengths, and
a plurality of computer interface units, each of said computer interface units being a standalone physical unit co-located with and coupled to one of said remote computers, each of said computer interface units comprising circuitry for receiving and transmitting keyboard, cursor control device and video signals, and a signaling circuit for generating a audible or visual signal upon detection of a specific event, wherein the signal is noticeable at least a coupled remote computer undergoing said specific event and at said at least one user interface unit, wherein said computer interface unit bi-directionally communicates with said user interface unit over a network.

16. A system according to claim 15, wherein the signal is emitted at a computer interface unit that detected the specific event.

* * * * *